April 14, 1970  S. E. SCISSON ET AL  3,505,821
METHOD OF PREPARING A CAVERN FOR STORING ANHYDROUS AMMONIA
Filed Oct. 21, 1968
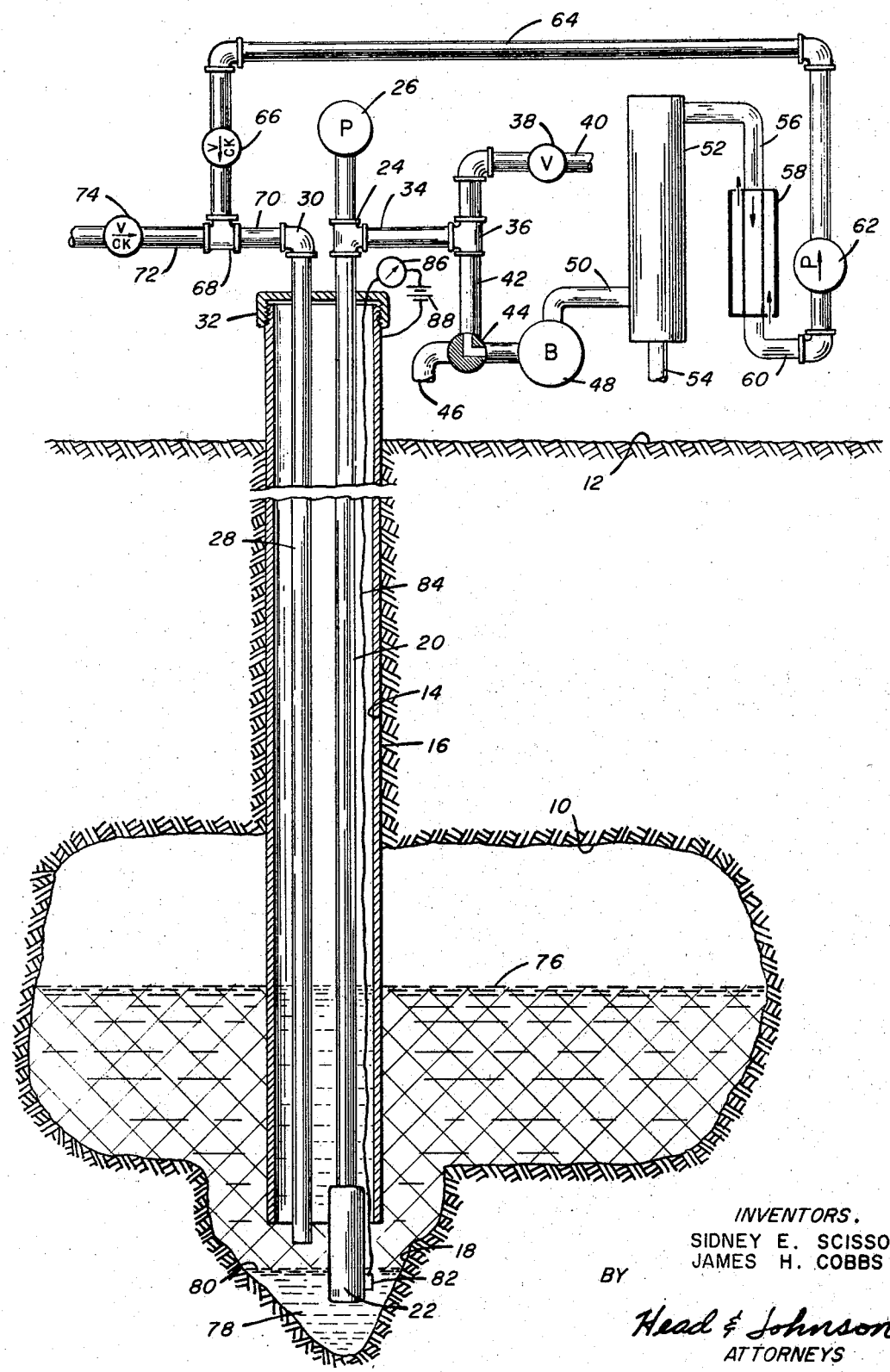
INVENTORS.
SIDNEY E. SCISSON
JAMES H. COBBS
BY
Head & Johnson
ATTORNEYS

United States Patent Office 3,505,821
Patented Apr. 14, 1970

3,505,821
METHOD OF PREPARING A CAVERN FOR STORING ANHYDROUS AMMONIA
Sidney E. Scisson and James H. Cobbs, Tulsa, Okla., assignors to Fenix & Scisson, Inc., Tulsa, Okla., a corporation of Oklahoma
Filed Oct. 21, 1968, Ser. No. 769,208
Int. Cl. B65g 5/00; E21f 17/16
U.S. Cl. 61—.5           5 Claims

ABSTRACT OF THE DISCLOSURE

This invention relates to a method of removing water from an underground cavern having a sump in the lower portion and having a tubular member extending from the earth's surface to the sump, the method including injecting anhydrous ammonia under pressure into the cavern and maintaining the pressure for sufficient time to cause the anhydrous ammonia to mix and react with the water in the cavern, including the connate water in the cavern formation surfaces. The product of such reaction and mixture flowing by gravity to the sump is then pumped to the surface. The steps of injecting anhydrous ammonia and pumping the product of the mixture and reaction to the surface may be repeated until the water content of the product is lowered to a predetermined maximum level.

Cross-reference

This disclosure is not related to any pending United States or foreign patent application.

Background and summary of the invention

The use of underground caverns for storing liquids and gases is well known and is becoming increasingly important in industry. For a variety of reasons, including economy, temperature stability, and safety, underground caverns have advantages over surface storage tanks. The type of gases and liquids which were first commonly stored in underground formations were primarily hydrocarbon products, such as propane and butane, which do not readily mix or react with water and the separation or removal of water from the caverns is not a serious problem. A different situation exists, however, when storing products which do mix and react with water. A particularly serious problem exists in the storage of anhydrous ammonia in underground caverns, It is well known that ammonia and water readily mix and react, the mixture producing aqua ammonia and the reaction producing ammonium hydroxide. One of the most important commercial uses of anhydrous ammonia today is in the agricultural industry as a fertilizer. The industrial standard for agricultural ammonia specifies a maximum water content of not more than .25 to .50 percent by weight. This means that in the delivered product only a relatively small percentage of water is acceptable. Other applications may require a water content of even lower maximum percentages.

When a cavern is constructed in the earth there is invariably introduced, by the course of nature, a water problem. Most all of the earth's structure near the surface, and particularly in agricultural areas, includes water in the rock formations. In addition, the temperature of cavern walls causes condensation of water from the air which fills and circulates in the cavern as it is constructed. In addition, most caverns are subjected to a pressure test of compressed air upon their completion and before being used for storage and this introduces additional opportunities for water to condense.

Obviously, one of the first steps in the completion of a cavern and the preparation of the cavern for accepting anhydrous ammonia is to pump from the cavern any accumulated water. Water, however, tends to adhere to the cavern surfaces and therefore it is substantially impossible to remove all of the water from the cavern in advance of introducing anhydrous ammonia into the cavern.

In addition virtually all rock formations include some connate water. Obviously, in the construction of a cavern a site is selected wherein the cavern will be formed in rock formation having minimum porosity and permeability. However, all rock structures have some porosity and permeability and frequently optimum site for cavern construction are not available. For this reason caverns are frequently constructed in formations wherein the rock structure is fairly permeable and in most instances the pore spaces in the rocks are filled with water. When anhydrous ammonia is introduced in the cavern formed in porous rock structure with the pore spaces filled with water, the ammonia reacts with the connate water producing a contamination of the anhydrous ammonia.

It is therefore an object of this invention to overcome these problems and provide a method of removing water from an underground cavern to prepare the cavern for storage of anhydrous ammonia therein.

More particularly, it is an object of this invention to provide a method and apparatus for preparing an underground cavern for the storage of anhydrous ammonia therein, and particularly in an arrangement wherein means is provided for removing the contamination of the anhydrous ammonia by the connate water of the formation in which the cavern is constructed.

Another object of this invention is to provide means of saving the ammonia from the contaminated product taken from the cavern during the process of preparing the cavern to receive anhydrous ammonia storage.

Description of the drawing

The drawing shows an underground cavern formed in the earth in cross-section having a casing also shown in cross-section communicating between the cavern and the earth's surface, and shows apparatus necessary to practice the invention, that is, to prepare the cavern for the storage of anhydrous ammonia.

Detailed description

Referring to the drawing, an underground cavern 10 is shown as formed below the surface of the earth 12. A vertical shaft 14 communicates the cavern 10 with the earth's surface 12 and receives a casing 16. The casing 16 will normally be sealed to the shaft 14 such as by means of cement (not shown) so as to prevent the escape of gas or fluid from the cavern along the exterior of the casing.

The cavern 10 includes a sump 18 in the lower portion thereof into which heavy components of fluid in the cavern flows. The casing 16 terminates within or at least immediately above the sump 18.

Positioned within the casing 16 is a first tubular structure 20 which has, at the lower end thereof, a pump 22. At the upper end of the tubular member 20 is a T-fitting 24 and above the T-fitting a pump prime mover 26. Pump 22 is typically actuated by a drive shaft (not shown) which extends from prime mover 26 within the tubular member 20. An alternate arrangement of pump 22 includes the use of a submersible electrically driven pump in which case the pump prime mover 26 would not be required and a conductor (not shown) would then normally extend exteriorly of the tubular member 20 and provide means of supplying electrical energy to the pump.

Positioned in the casing 16 is a second tubular structure 28 which is provided at the upper end thereof with an elbow fitting 30.

The tubular structures 20 and 28 are sealed relative to casing 16 by means of an upper closure member 32 so that the entrance or exit of liquid or gases from the cavern must be through one of the tubular structures 20 or 28.

Extending from the T-fitting 24 is pipe 34 which connects with a second T-fitting 36. The upper end of the T-fitting 36 communicates with a valve 38 and a product discharge pipe 40 by means of which product from the cavern may be delivered.

Extending from the lower end of the T-fitting 36 is a pipe 42 which passes to a two-way valve 44. In one position of valve 44 pipe 42 communicates with a product discharge pipe 46 and in the other position of valve 44 pipe 42 with a boiler 48. Fluid passing to boiler 48 is subjected to heat which converts the fluid product into gases, the gases passing by way of pipe 50 to a fractionating column 52. In the fractionating column the temperature of the gases is lowered to the dew point of the water content and the water is discharged through pipe 54 with the ammonia in the form of gas passing out of the column through pipe 56. The gas from pipe 56 passes through a heat exchanger 58 wherein the ammonia vapor is condensed into liquid. The liquid ammonia is conveyed out of heat exchanger 58 through pipe 60. By means of pump 62 the liquid ammonia is pumped by way of pipe 64, check valve 66, and T-fitting 68, to inlet pipe 70. Thus by means of pump 62 ammonia collected in the heat exchanger 58 may be injected back into the cavern.

Pipe 72, having check valve 74 therein, provides means wherein anhydrous ammonia is conveyed to the second tubular structure 28 and discharged into the cavern.

As illustrated, anhydrous ammonia 76 partially fills the cavern while the sump 22 contains contaminated product 78 in the form of water or the mixture of water and ammonia, that is, aqua ammonia and/or ammonium hydroxide. Between the contaminated product 78 and the anhydrous ammonia 76 is an interface 80 which represents the transition from the contaminated product, including water, to the substantially water free anhydrous ammonia 76.

To indicate the presence of contaminated product 78 in sump 18 a probe 82 is shown affixed to pump 22. Conductor 84 extends within the casing 16 and out through closure member 32. An ammeter 86 is connected to conductor 84 in series with a voltage source 88 which in turn is connected back to tubular structure 20. Probe 82 is responsive to detect the conductivity of fluid in the sump 18 which conductivity is reflected by the indication on ammeter 86.

Method of operation

When cavern 10 is first constructed there will normally be water which seeps from the structure during construction, which water will flow into sump 18. As has been previously stated, all rock structures include some porosity and in most geographical locations the rock structure in which caverns are formed will include substantial amounts of connate water in the pores of the rocks. In addition, air in the cavern causes condensation of water to appear on the walls of the cavern and this is particularly true when the cavern is injected with air pressure during testing.

A first step in preparing the cavern to receive anhydrous ammonia, after it has been tested, is to pump all of the free water out of sump 18. This can be done by means of pump 22, the water passing up through tubular structure 20, pipe 34, T-fitting 36, pipe 42, and with valve 44 approximately positioned, the water is discharged through product discharge pipe 46. This serves to rid the cavern of all of the free water. However, substantial quantities of water remain in the typical cavern after all that which will normally flow by gravity is extracted. This remaining water constitutes a contaminant which may contaminate substantial quantities of anhydrous ammonia.

According to this invention the cavern is treated to remove water before storage of anhydrous ammonia. A quantity of anhydrous ammonia is injected through tubular structure 28 into the cavern. The quantity of ammonia injected depends upon several factors, including the size of the cavern and the amount of connate water the cavern walls carry. In the reduced pressure of the cavern the anhydrous ammonia passes into vapor form and contacts thoroughly the complete surface of the cavern. This contact produces a mixture and a reaction with the connate water in the pores of the rock structure forming the cavern walls. The contact of the ammonia with the connate water produces a waste product in the form of aqua ammonia and ammonia hydroxide in varying proportions. This product flows from the cavern walls and into the sump. The same thing occurs to moisture contained in the air which remains in the cavern. In addition, the moisture of condensation adhering to the cavern walls, the tubular extension of the casing and the tubular elements extending into the cavern are contacted by the anhydrous ammonia resulting in a reaction mixture waste product which flows into sump 18.

After permitting sufficient time for the reaction to take place, which will vary according to the size of the cavern, and the porosity and permeability of the cavern walls, pump prime mover 26 is energized actuating pump 22 to force the contaminated product 78 out of the cavern. The product passes upwardly through first tubular structure 20. With valve 44 appropriately positioned to communicate with discharge pipe 46 the contaminate product may be discharged. However, if the cavern is large, or if a substantial amount of connate and other contaminate water remains in the cavern, the quantity of contaminated product may be substantial. That is, it may contain substantial quanities of ammonia. Rather than to discharge and thereby lose the ammonia, valve 44 may be positioned to direct the flow from pipe 42 into boiler 48. In the boiler the contaminated product is heated to transform the product into the vapor form. The vapor flows from the boiler 48 through pipe 50 to fractionating column 52 wherein the water is condensed out and discharged through pipe 54. The vapor remaining, being primarily ammonia, passes out of fractionating column through pipe 56 into heat exchanger 58 wherein it is converted into the liquid stage. By means of pump 62 the liquid ammonia may be conducted back into the cavern.

In the usual application of the invention the cavern will need to be flushed several times with ammonia in order to extract all the contaminate water. By this invention the ammonia may be recycled, either continuously or in batches, until the water content of the contaminate product is lowered to a predetermined maximum percentage. When this is reached the cavern is sufficiently free of water to permit its usage for storage of anhydrous ammonia.

After the water in the cavern has been reduced to the point at which there will be no contamination of anhydrous ammonia beyond an acceptable level, valve 44 is placed in the off position. Anhydrous ammonia is injected through check valve 74 and pipe 72 to fill the cavern as desired. When required to remove the anhydrous ammonia pump prime mover 26 is energized and valve 38 opened so that the product is discharged through pipe 40.

The cavern may then be used to receive the storage and discharge of the anhydrous ammonia as needed. As it is used, particularly during the first period, a gradual additional contamination of water may occur by the increased depth of penetration of the ammonia into the rock structure forming the walls of the cavern. This will produce additional reaction of the ammonia and connate water. The contaminated products being heavier than the anhydrous ammonia will flow into the sump 18. When sufficient contaminated product has accumulated so as to impair the delivery of an acceptable anhydrous ammonia product the sequence previously described of routing the contaminated product through boiler 48, fractionating column 52 and heat exchanger 58 may be repeated to extract the water without losing any of the ammonia.

To enable the operator to know when a quantity of contaminated products has accumulated in sump 18 requiring treating to remove the water portion thereof, a probe 82 may be positioned at the lower end of pump 22. When the level of conductivity reflected on ammeter 86 indicates that contaminated product exists then the operator can switch valve 44 and recycle the product until the water level has been lowered in the acceptable level.

In some installations the amount of contamination which occurs may not be sufficient to justify the installation of the boiler, fractionating column and heat exchanger as illustrated. Where the cavern is relatively small or the rock formation in which the cavern is located is relatively low in porosity and permeability, or the connate water content is low, the contaminated product may simply be discharged rather than treated. Another arrangement for treating caverns wherein the amount of contaminated product does not justify a permanent treating installation includes mounting the treating system including boiler 48, fractionating column 52, heat exchanger 58, and pump 62 as a portable unit. During the initial period of preparing a cavern to receive anhydrous ammonia and during the initial storage period, the portable equipment may be located at the cavern's sight. Later, when the water contamination has stabilized at an acceptable low level, the portable equipment may be moved to a different cavern.

It can be seen that the apparatus for practicing the invention may be rearranged in innumerable ways. Various different arrangements may be provided as means of injecting anhydrous ammonia into the cavern and removing it therefrom. It can be seen, for instance, that only one tubular structure may be utilized with the injection of anhydrous ammonia to be stored passing downwardly through pump 22. The apparatus illustrated is merely exemplary of one way of practicing the method of the invention. It is understood that the invention is not to be limited by the abstract herein, nor the summary, nor the illustrated embodiments presented for purposes of exemplifying one means of applying the invention, but the invention is to be limited by the scope of the attached claim or claims, including the full range of equivalency to which each element thereof is entitled.

What is claimed:

1. A method of removing water from an underground cavern, including removing connate water carried by the formation making up the cavern walls, ceiling and floor surfaces, to prepare the cavern for storage of anhydrous ammonia therein, the cavern having a sump in the lower portion thereof and a tubular element extending from the earth's surface to the sump, the method comprising the steps of:
   (a) pumping free water accumulated in the sump from the cavern;
   (b) injecting anhydrous ammonia under pressure into the cavern and maintaining the pressure for a duration sufficient to cause the anhydrous ammonia to mix and react with water in the cavern, including connate water in the cavern formation surfaces, the product of such reaction and mixture flowing by gravity to the sump; and
   (c) pumping the product of the reaction mixture from the sump.

2. A method of removing water from an underground cavern according to claim 1 including repeating steps (b) and (c) sequentially until a preselected maximal proportion of water is contained in the product pumped from the sump, 3. A method of removing water from an underground cavern according to claim 1 including the step of:
   passing the product of the reaction and mixture pumped from the sump through an anhydrous ammonia recovery apparatus.

4. A method of removing water from an underground cavern to prepare the cavern for storage of anhydrous ammonia therein according to claim 3 including the step of:
   reinjecting the anhydrous ammonia recovered from the recovery apparatus back into the cavern.

5. A method of removing water from an underground cavern to prepare the cavern for storage of anhydrous ammonia therein according to claim 3 including the steps of:
   heating the product of the reaction and mixture pumped from the sump to convert the product to the gaseous state;
   passing the heated product in the gaseous state to a fractionating column wherein the water content is condensed out and discharged; and
   passing the gaseous ammonia from the fractionating column to a heat exchanger wherein the gaseous ammonia is converted to the liquid state.

References Cited

UNITED STATES PATENTS

| | | | |
|---|---|---|---|
| 2,787,455 | 4/1957 | Knappen | 61—.5 |
| 2,901,403 | 8/1959 | Adams et al. | 61—.5 |
| 3,084,515 | 4/1963 | Dougherty | 61—.5 |
| 3,089,309 | 5/1963 | Closs et al. | 61—.5 |

PETER M. CUAN, Primary Examiner